Patented Dec. 5, 1922.

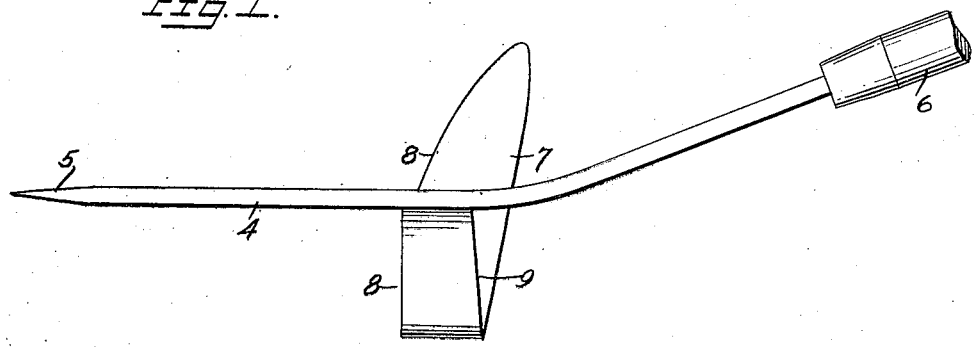
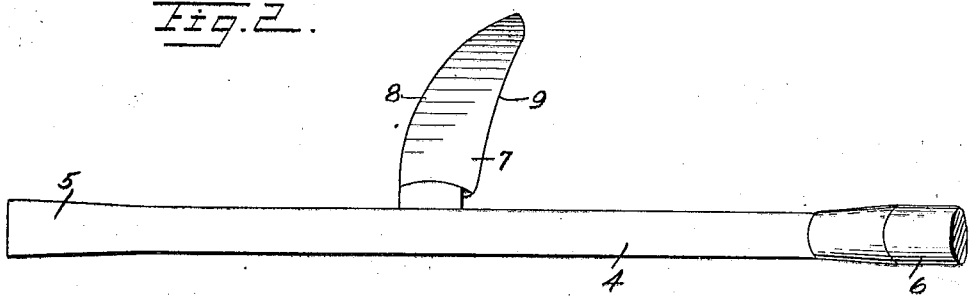
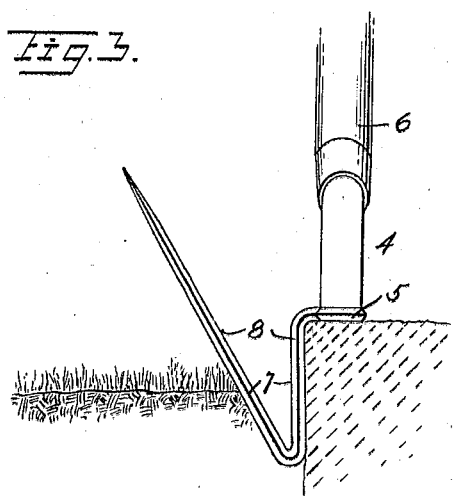

1,438,095

UNITED STATES PATENT OFFICE.

ZACHARIAH TAYLOR CLARK, OF PORTLAND, OREGON.

GARDEN TOOL.

Application filed July 6, 1921. Serial No. 482,702.

*To all whom it may concern:*

Be it known that I, ZACHARIAH TAYLOR CLARK, a citizen of the United States, and a resident of Portland, in the county of Multnomah and State of Oregon, have invented a new and Improved Garden Tool, of which the following is a full, clear, and exact description.

My invention relates to garden tools, and has reference more particularly to a curb trimmer or similar tool. The object of the invention is to provide a simple, efficient and inexpensive tool that can be used in trimming lawns, gardens and the edges of flower beds and sidewalks. It can also be used for removing sprouts or limbs from shrubbery, for removing useless briars from berry bushes or vines and for extracting deep-rooted weeds from lawns with little or no damage to the lawn.

With the above and other objects in view, the nature of which will more fully appear as the description proceeds, the invention consists in the novel construction, combination and arrangement of parts as herein fully described, illustrated and claimed. In the accompanying drawings, forming part of the application, similar characters of reference indicate corresponding parts in all the views.

Figure 1 is a side elevation of my tool;

Figure 2 is a top plan view thereof; and

Figure 3 is a front elevation of the tool.

The tool comprises a chisel 4, the cutting edge 5 of which is slightly enlarged. The rear portion of the chisel is raised so that the chisel is slightly curved. The end of the raised portion receives a handle 6 by means of which the tool is manipulated. Extending laterally from the chisel and downward therefrom adjacent the bend is a V-shaped knife 7 the edges 8 and 9 of which are cutting edges. The free wing of the V has a length substantially twice that of the other wing and bends slightly away from the cutting edge 5 of the chisel 4, as best indicated in Figures 1 and 2. The other wing of the blade is at right angles to the chisel 4 and serves, in addition to being a cutting edge, as a guide when used for trimming edges.

The portion of the V-shaped blade projecting below the chisel 4 serves for trimming or plowing off the sod from the curve or edge of a bed in a lawn or garden. To insure or facilitate the passing of the sod through the V-shaped blade, the back or rear of the V, that is, the distance between the edges 9, is greater than the distance between the edges 8. This affords an easy and clean cutting of the sod. The back sharp edge 9 is used for pruning bushes or vines. When used as a pruning hook, the long end of the V-shaped blade is placed close to the ground on the opposite side of the briar or sprout and touching it near the point of the blade. The blade is given a quick jerk by the operator and, owing to the sharpness and slope of the blade, it slips through, readily cutting the stock.

By placing the V-shaped blade back of the cutting edge 5 the same can be utilized as a rooter for deep-rooted weeds by sinking it into the ground as a spade, and by prying the handle backwards the sharp edge 5 will break the root in the ground and the weed can then be easily removed by hand after the tool has been removed from the ground. By placing the foot upon the ground where the tool and the weed have been withdrawn, all the grass about the removed weed will be saved.

While I have described the principle of operation, together with the device which I now consider to be the best embodiment thereof, I desire to have it understood that the device shown is merely illustrative and that such changes may be made as are within the scope of the appended claims.

I claim:

1. In a garden tool, an elongated chisel the rear portion of which is bent, a handle associated with the end of the bent portion for manipulating the chisel, a V-shaped blade extending laterally and downwardly from said chisel substantially midway between the ends of the chisel, the free wing of said V-shaped blade being longer than the other wing, said other wing being at right angles to the chisel, said V-shaped blade having cutting edges in the front and rear thereof, the distance between the wings in the rear being slightly greater than that in the front.

2. In a garden tool, an elongated chisel having the rear portion thereof bent upwardly, a handle associated with the end of the bent portion for manipulating the chisel, and a V-shaped blade projecting laterally and downwardly from said chisel adjacent the bend in the chisel whereby said blade is set rearwardly of the cutting edge of the chisel, the free wing of said V-shaped blade being longer than the other wing and curving away from the cutting edge of the chisel, the other wing of the blade being at right angles to the plane of the chisel, said blade having cutting edges in the front and rear thereof, the distance between the rear cutting edges being greater than the distance between the front cutting edges, substantially as and for the purpose set forth.

ZACHARIAH TAYLOR CLARK.